(12) United States Patent
Patel

(10) Patent No.: US 6,835,413 B2
(45) Date of Patent: Dec. 28, 2004

(54) SURFACE COATING FOR INSULATION PACK

(75) Inventor: Bharat D. Patel, Pickerington, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 59 days.

(21) Appl. No.: 10/245,520

(22) Filed: Sep. 17, 2002

(65) Prior Publication Data
US 2004/0052954 A1 Mar. 18, 2004

(51) Int. Cl.[7] .............................. B05D 1/12; B05D 1/38
(52) U.S. Cl. .................... 427/202; 427/208.8; 427/276; 427/287; 427/389.4
(58) Field of Search .......................... 427/208.6, 208.8, 427/202, 276, 284–288, 356, 358, 389.8, 394, 294, 296, 322, 324; 156/88, 256, 259, 324, 309.9

(56) References Cited

U.S. PATENT DOCUMENTS

| | | | |
|---|---|---|---|
| 4,859,527 A | * | 8/1989 | DiStefano |
| 4,990,370 A | | 2/1991 | Terry et al. |
| 5,211,988 A | * | 5/1993 | Morton |
| 5,281,437 A | * | 1/1994 | Singh |
| 5,487,412 A | | 1/1996 | Matthews et al. |
| 5,722,213 A | | 3/1998 | Morency |
| 5,972,434 A | | 10/1999 | Kajander |
| 6,228,476 B1 | | 5/2001 | Bogrett et al. |
| 6,284,313 B1 | | 9/2001 | Matthews et al. |
| 2001/0033926 A1 | | 10/2001 | Matthews et al. |

FOREIGN PATENT DOCUMENTS

WO   WO98/24620 A   * 11/1998

* cited by examiner

Primary Examiner—Fred J. Parker
(74) Attorney, Agent, or Firm—Inger H. Eckert; Stephen W. Barns; Maria C. Gasaway

(57) ABSTRACT

A continuous and flexible method and apparatus is provided for applying one or more coating materials to internal and/or external portions of a fiber batt to provide edge and surface coating layers on those surfaces of the fiber batt that will be exposed during subsequent use. The invention provides for the coating to be applied selectively all exposed surfaces of a fiber batt and provided internally within the fiber batt for later splitting into opposing edges, thereby improving both the manufacturing process and the consistency and flexibility of the resulting product by reducing or eliminating the need for subsequent manual coating of unfinished edge surfaces.

15 Claims, 6 Drawing Sheets

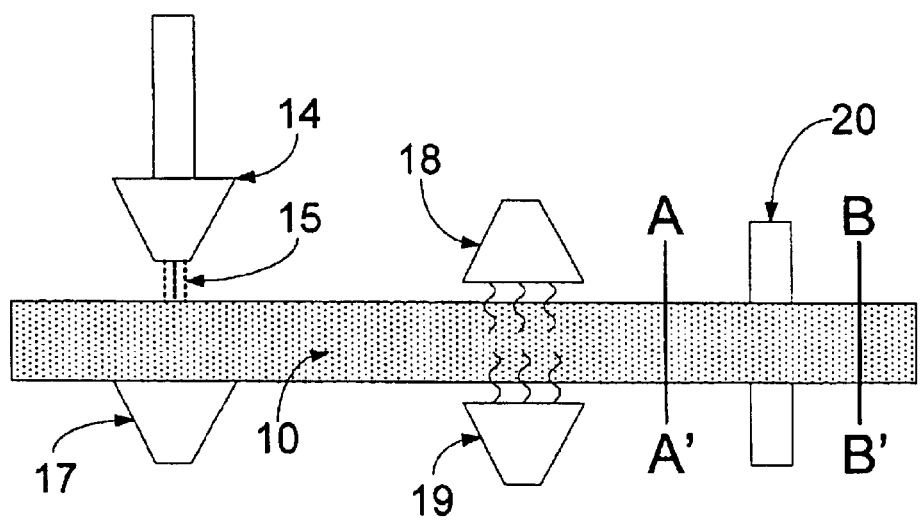
FIGURE 3
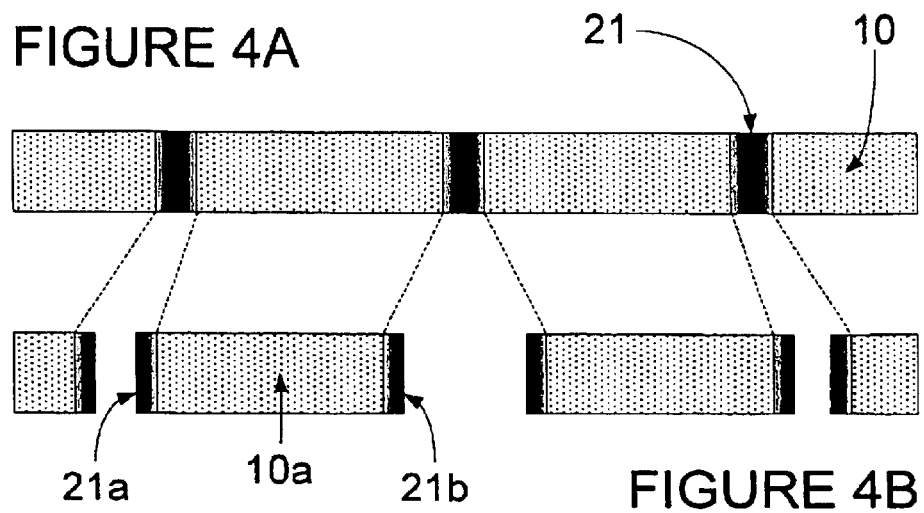

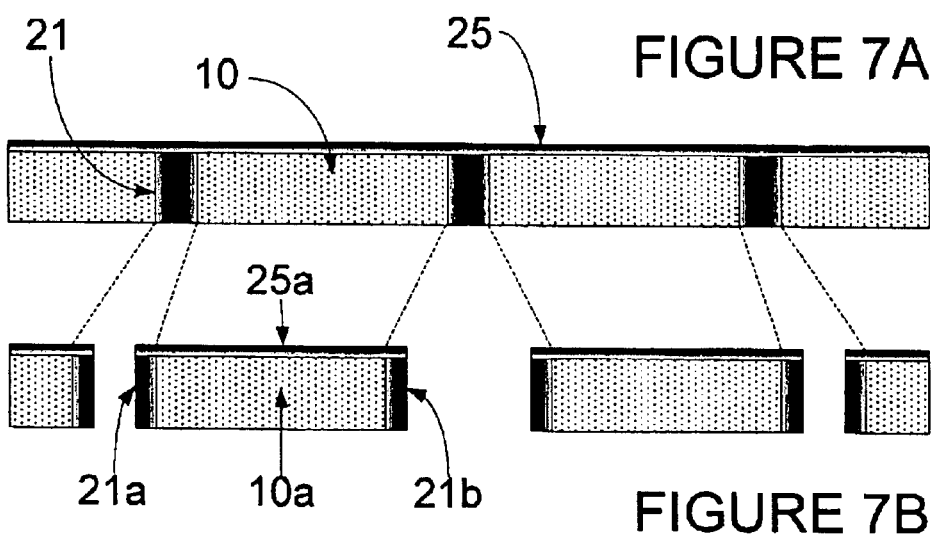
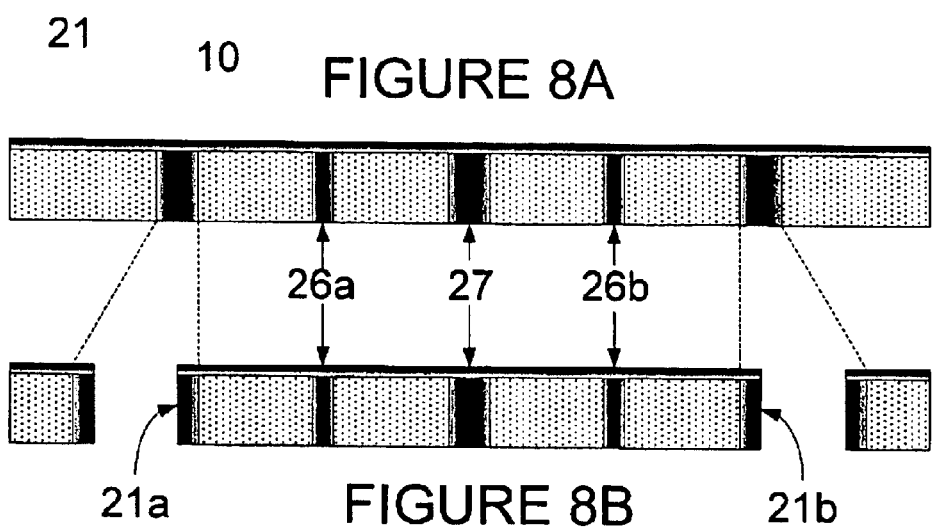

SURFACE COATING FOR INSULATION PACK

BACKGROUND OF THE INVENTION

1. Field of the Invention

This invention generally relates to a method and apparatus for continuously and selectively applying surface coatings and/or reinforced regions to a fiber batt to form a duct liner, duct wrap, dust board or similar product in which the exposed surfaces are provided with a suitable coating.

2. Description of the Prior Art

It is a well known to use a layer or batt of fiberglass, polymeric fiber or combination of fibers as an internal liner for sheet metal ductwork in heating, ventilating and air conditioning applications. Such liners insulate the ductwork to maintain the temperature of the air passing through the duct and, during cooling operations, to prevent condensation on exterior surfaces of the duct. These batts, can also can provide efficient sound absorption to control or decrease noise transmission within ductwork or in other applications. Particularly for batts used as duct liners, an interior surface of the liner will be exposed, at least periodically, to high velocity air flow. As a result, various federal, state, local and trade association regulations mandate that such liners meet certain standards.

One of the standards the liner must typically meet requires a certain resistance to erosion or degradation caused by the air flow through the duct. Such standard typically require that duct liners shall not break, flake, delaminate or otherwise erode at air flow velocities representing the greater of a specified multiple of the rated velocity or some minimum velocity. In order to accommodate such standards, manufacturers of such duct liners typically coat at least the major surface of the fiber batt that will be exposed to the air with one or more layers of materials that will prevent degradation of the underlying batt. Such layers may comprise a rubber or polymeric material that, when cured, forms a tough protective skin on the treated surface. Similarly, a fabric layer may be attached to the surface either singly or in combination with one or more underlying layers.

The coatings used in conjunction with duct liners have included a variety of elastomeric aqueous cross-linkable emulsion compositions such as acrylic emulsions. Typically, these elastomeric cross-linkable compositions are frothed or foamed prior to being applied to the fiber batt or other insulating sheet in order to provide a generally uniform coating on at least one major surface of the insulation. When the coating is heat cured, the emulsion coating composition is heated to a temperature and for a duration sufficient to evaporate the majority of the water and cause the frothed or foamed coating to collapse (i.e., coalesce and lose bubbles from the froth or foam). Heat curing also causes the elastomeric resins to cross link to form a thin protective coating.

Examples of such coating processes are provided in U.S. Pat. No. 4,990,370, issued Feb. 5, 1991, On-Line Surface and Edge Coating of Fiber Glass Duct Liner; U.S. Pat. No. 5,211,988, issued May 18, 1993, Method for Preparing a Smooth Surfaced Tough Elastomeric Coated Fibrous Batt; and U.S. Pat. No. 5,487,412, issued Jan. 30, 1996, Glass Fiber Airduct With Coated-Interior Surface Containing a Biocide. An example of a multilayer coating process is provided in U.S. application U.S. Ser. No. 2001/0033926, published Oct. 25, 2001.

These duct liners and other insulation products are typically provided by the manufacturers in rolls of approximately 100 feet in length and in a variety standard widths ranging between two and five feet. The duct manufacturers, in turn, attach the duct liner to a sheet metal surface with the coated side exposed and then trims the sheet metal and duct liner combination to standard widths and lengths that are then bent and formed into duct work with the duct liner providing the interior surface.

In some instances, however, the edges of the batt are not coated and in other instances, the trimming and forming creates an uncoated edge on the duct liner batt. In such instances, the uncoated surfaces represent areas that would be more prone to erosion, requiring the duct manufacturers and installers to coat or otherwise seal the exposed batt to comply with the relevant standards. Frequently this additional coating was applied during duct manufacturer after the initial forming of the sheet metal to produce a series of L-shaped duct portions. These duct portions can then be stacked to expose the uncoated edges and an adhesive or other sealant composition applied manually using a spray gun, brush, or roller. This practice, however, requires additional labor and handling by the duct manufacturer and can lead to visually unattractive results, varying coating quality, and environmental concerns. Further, such manually applied coatings may not, in fact, be sufficient to satisfy the applicable performance standards.

Another alternative is to supply batt users, particularly users such as HVAC duct and vehicle manufacturers, with a wider range finished batt widths to reduce the need for trimming batts to ensure an appropriate fit. This approach, however, complicates the ordering, manufacturing and inventory systems associated with Just-In-Time (JIT) by increasing the number of parts that have to be tracked.

SUMMARY OF THE INVENTION

The present invention provides a continuous and flexible method and apparatus for applying a coating material to portions of a fiber batt that may become an exposed surface in a subsequent application. The present invention provides for the selective coating of both major surfaces and actual or potential edge surfaces, thereby improving both the manufacturing process and the consistency and flexibility of the resulting product by reducing or eliminating the need for manual coating of unfinished edge surfaces.

BRIEF DESCRIPTION OF THE DRAWINGS

FIG. 3 is a schematic view of the coating application according to the first embodiment of the present invention.

FIGS. 4A–B are cross-sectional views of a resulting fiber batt at the points indicated on FIG. 3.

FIGS. 7A–B are cross-sectional views of a resulting fiber batt at the points indicated on FIG. 5.

FIGS. 8A–B are cross-sectional views of an alternate fiber batt at the points indicated on FIG. 5.

DETAILED DESCRIPTION OF THE INVENTION

Figure 1:
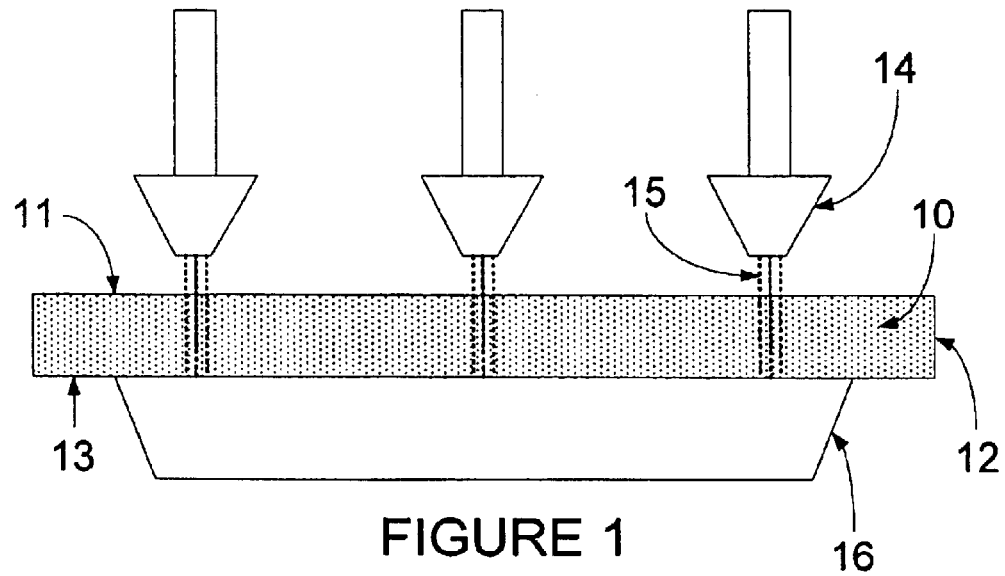
FIG. 1 is a schematic view of the coating application according to a first embodiment of the present invention.

As shown in FIG. 1, a first embodiment of the coating application feeds a fiber batt 10 past one or more ejector heads 14 that apply a binder composition 15 to the fiber batt. The binder composition 15 may comprise one or more liquid binder solutions, dry particulate materials or slurries that, under the selected application conditions, can penetrate a desired distance into the fiber batt. Depending on the coating system utilized and the materials selected, the fiber batt, or the individual fibers that comprise the batt, may be treated to improve the effectiveness of the binder coating operation. Such treatments may alter the surface characteristics of the fibers or may simply comprise moistening portions of the fiber batt to improve retention of a particulate coating material within the batt. In the event that a binder solution or slurry is utilized, the coating operation may include a drying step to remove at least the majority of the water or other solvent before actually curing the binder composition.

The coating material 15 is applied to selected regions of the upper surface 11 of the fiber batt under conditions that ensure that the coating material is preferably distributed throughout the thickness of the fiber batt in a relatively narrow band. Depending on the characteristics of the fiber batt 10, such as thickness and open volume, and the coating material 15, such as viscosity, flowrate, particle size distribution and ejection velocity, a vacuum device 16 may be provided adjacent the rear surface 13 of the fiber batt to assist in the penetration of the coating material through the fiber batt.

Figure 2:
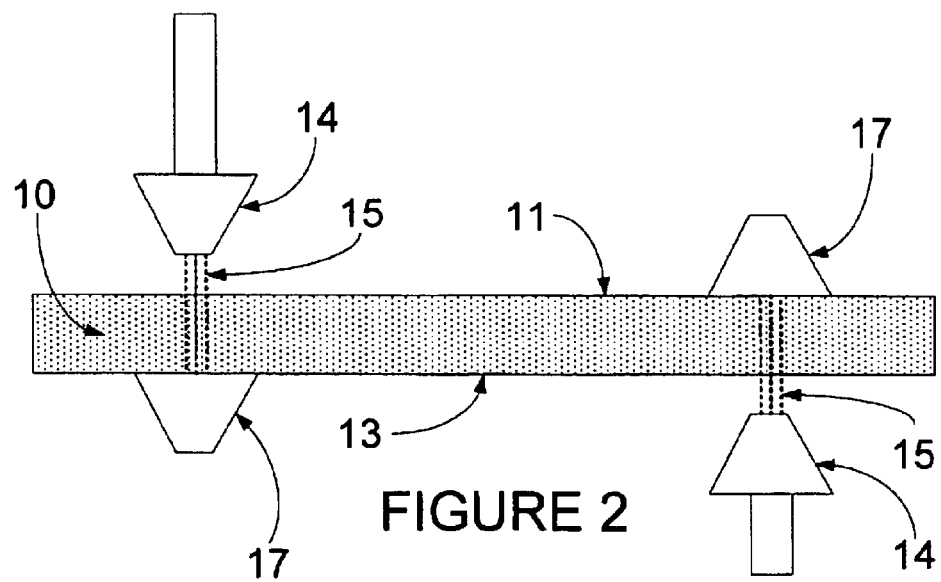
FIG. 2 is a schematic view of the coating application according to a second embodiment of the present invention.

Although, as shown in FIG. 1, a common vacuum device 16 may serve a number of ejector heads 14, in the embodiment shown in FIG. 2, each of the ejector heads is associated with a dedicated vacuum device 17 to provide additional control of the penetration of the coating material 15. As also shown in FIG. 2, the coating material 15 may be applied to the fiber from the rear surface 13, preferably with a vacuum assist from a vacuum device 17. The availability of two-sided coating allows full thickness coating of the fiber batt under operating conditions that would preclude a single-sided application from achieving sufficient coating material density throughout the entire thickness of the fiber batt. Such operating conditions may include fiber batts that are thicker and/or denser, more viscous coating compositions, or the need to limit pressure applied to the fiber batt.

FIG. 3 illustrates the manufacturing stages of a preferred embodiment of the invention as the fiber batt 10 moves from left to right through the apparatus. As the fiber batt 10 passes under ejector head 14, a coating material 15 is injected, optionally with vacuum assist 17, through the thickness of the fiber batt. The impregnated fiber batt passes adjacent one or more heaters 18, 19 or through an oven and heated to a temperature sufficient to cure, melt or flow the coating material to form one or more coating layers extending through the fiber batt. In applications utilizing a liquid coating material, additional dryers or evaporators may be arranged after the ejector heads to remove a portion of the solvent, typically water, before the impregnated batt enters the curing operation. After the coating layers have cooled sufficiently, the fiber batt 10 may be split into a number of smaller fiber batts by splitter 20 that separates the fiber batt at the coating layers.

In addition to the primary polymer or resin component, typical coating materials used in the present invention may be formulated to vary the elasticity, abrasion resistance, rigidity, density, flammability, water resistance, color, etc. of the resulting coating or film. These coating materials may also include, without limitation, pigments, fillers, fire retardants, organic or inorganic biocides, bactericides, fungicides, viscosity modifiers, water repellents, surfactants and curing catalysts.

FIG. 4A illustrates a cross-sectional of a fiber batt 10 in which three coating layers 21 have been formed. FIG. 4B illustrates the same fiber batt 10 after it has passed through splitters 20 that are aligned with each of the coating layers 21 to produce standard size fiber batts 10a having coating layers 21a, 21b on the exposed edges.

Figure 5:
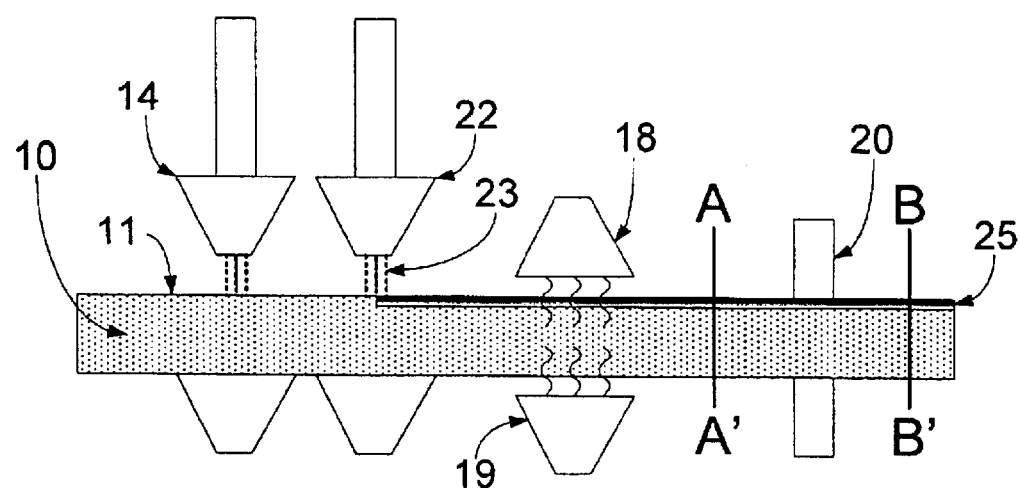
FIG. 5 is a schematic view of the coating application according to a third embodiment of the present invention.

FIG. 5 illustrates a preferred embodiment of the present invention in which the fiber batt 10, after the initial injection of the coating material 15 through ejector heads 14, passes under a second ejector or series of ejectors 22 that deposit a coating material layer 25 on or near the surface 11 of the fiber batt. Again, depending on the coating material and the batt, the second ejector may be provided with a corresponding vacuum device 24 to ensure sufficient penetration of the coating material 23. Further, although it is preferred that the surface layer 25 is deposited after the interior coating layers 21 have been formed, depending on the materials selected and the intended application, the interior coating layers could also be formed by injecting a coating material or materials through a previously formed surface layer.

Figure 6:
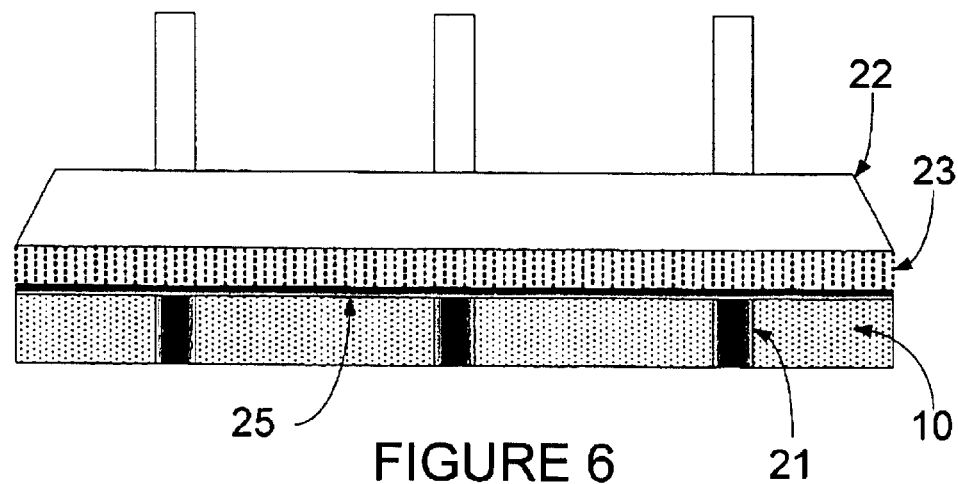
FIG. 6 is a schematic view of the coating application according to the third embodiment of the present invention.

Although it is generally preferred that the coating material injected into the fiber batt 15 and the coating material applied only near the surface 23 are the same or similar materials, depending on the intended application and the desired properties the coating materials may be quite different and one or both may comprise a mixture of materials. After depositing the surface layer 25, the impregnated fiber batt is again heated to a temperature sufficient to cure or fuse substantially all of the coating materials that have been added to the fiber batt. One embodiment for the ejector 22 is illustrated in FIG. 6 in which a single broad ejector is used to deposit the coating material 23 on the surface of the fiber batt 10.

FIG. 7A illustrates a cross-sectional of a fiber batt 10 in which three coating layers 21 have been formed through the fiber batt and a surface layer 25 has been formed on or at a main surface 11 of the fiber batt. FIG. 7B illustrates the same fiber batt 10 after it has passed through splitters 20 that are aligned with each of the coating layers 21 to produce standard size fiber batts 10a having coating layers 21a, 21b on the exposed edges and a face layer 25a on the main surface.

FIG. 8A illustrates a cross-sectional of an alternative fiber batt 10 in which two coating layers 21, two smaller reinforcing regions, 26a and 26b, and a larger reinforcing region 27, have been formed through the fiber batt and a surface layer 25 has been formed on or at a main surface 11 of the fiber batt. FIG. 8B illustrates the same fiber batt 10 after it has passed through a splitter 20 that was aligned with each of the coating layers 21 to produce a fiber batt 10a having coating layers 21a, 21b on the exposed edges, a face layer 25a on the main surface, and reinforcing regions 26a–b, 27 to adjust the mechanical properties of the resulting batt. As will be appreciated, the sizing, spacing, and material(s) used to form the reinforcing regions may be adjusted to provide a wide range of properties in the resulting fiber batt product.

Figure 9:
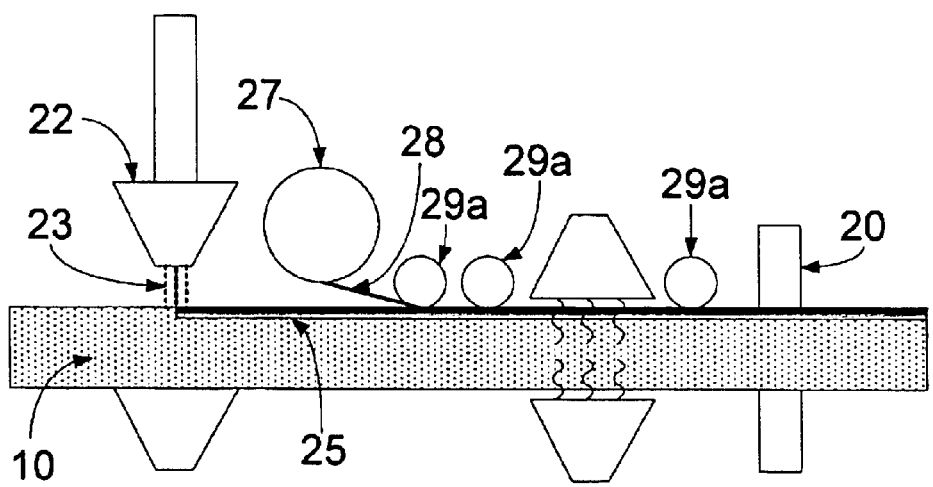
FIG. 9 is a schematic view of the coating application according to a fourth embodiment of the present invention.

FIG. 9 illustrates a fourth embodiment of the invention that incorporates the addition of a non-woven material into the fiber batt coating. As the fiber batt 10 passes under ejector 22, a layer 25 or pattern 25a of one or more coating materials 23 is formed on or near the surface of the fiber batt. A non-woven fabric 28, typically taken from a roll 27, is then applied to fiber batt over the layer 25 or pattern 25a of the coating material. The contact between the fabric 28 and the coating material may be maintained by a series of rollers 29a, or other conventional mechanisms (this includes compression in most cases), until the curing has been completed. The fiber batt is then heated to a temperature sufficient to cure or fuse the coating material, thereby attaching the fabric 28 to the fiber batt.

Figures 10A, 10B:
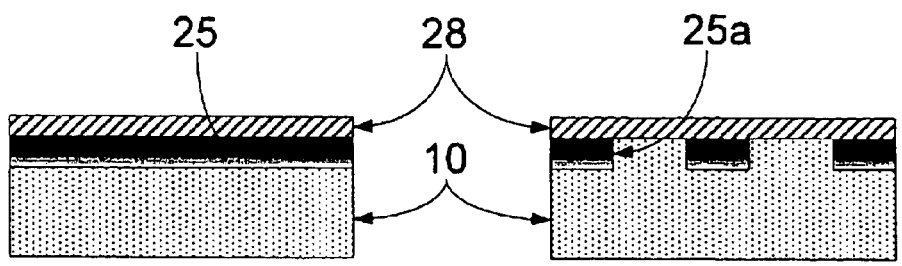
FIGS. 10A–C are cross-sectional views of alternate fiber batts according to the fourth embodiment of the present invention.
Figure 10C:
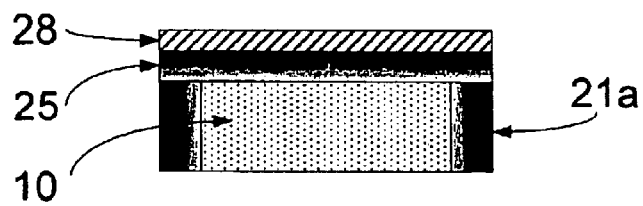

FIGS. 10A and 10B illustrate the construction of the resulting fiber batt product with the non-woven fabric 28 forming the outermost layer of the coating. As illustrated in FIG. 10C, additional ejector heads as provided in FIGS. 1–3 and 5 may also be incorporated into the mechanism of FIG. 9 for creating coating layer regions 21 that can be split into coating layers 21a–b and thereby seal the edges of the resulting fiber batt product. Alternatively, the non-woven fabric 28 may be replaced, or supplemented, by a film layer, with the laminated structure then being heat set using one or more hot rolls.

Figure 11:
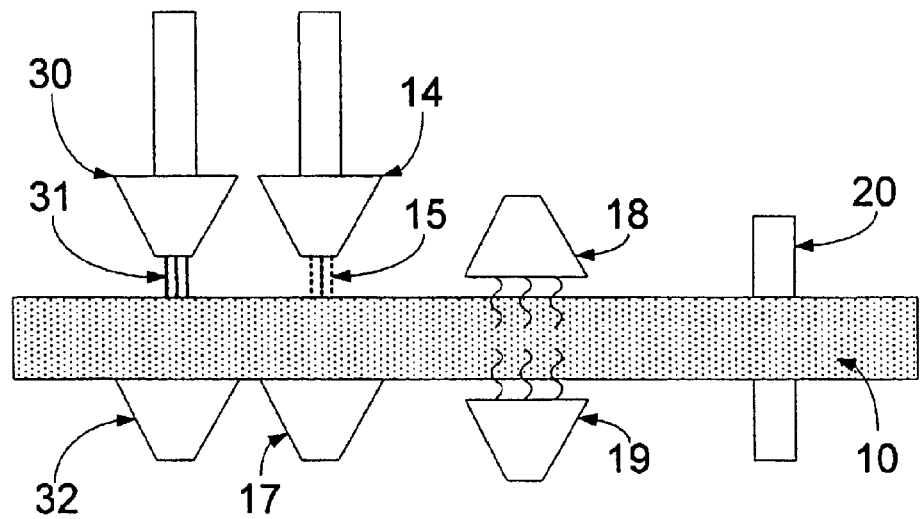
FIG. 11 is a schematic view of the coating application according to a fifth embodiment of the present invention.

As illustrated in FIG. 11, a fifth embodiment of the invention provides for the activation of regions of the fiber batt for receiving the coating material. An activator 30 directs an activator stream onto the fiber batt 10 in order to activate the region that is intended to receive the coating material 15. The particular method of activation will be determined by the particular combination of fiber batt and coating material that will be used. For instance, the activation may be accomplished by heating narrow regions of the fiber batt 10 to increase the adhesion of the coating material on the heated portions of the fibers that comprise the fiber batt. Alternatively, the activation may comprise an adhesive or solvent that will coat portions of the fiber and increase the retention of the coating materials on the coated portions.

As illustrated in FIG. 11, an ejector 30 may be used to apply a stream of an activating liquid 31 to the fiber batt 10. The penetration of the activating liquid 31 into the fiber batt and/or the removal of excess liquid may be assisted by a corresponding vacuum assembly 32 arranged opposite the ejector 30.

In any event, after activating selected regions of the fiber batt 10, corresponding ejectors 14 are used to apply the coating material to the activated portions of the fiber batt. The impregnated fiber batt is then heated to cure, set or fuse the coating material to form the desired fiber batt product. After the coating layers have cooled sufficiently, the fiber batt 10 may be split into a number of smaller fiber batts by splitter 20 that separates the fiber batt at the coating layers to form a fiber batt product.

Figure 12:
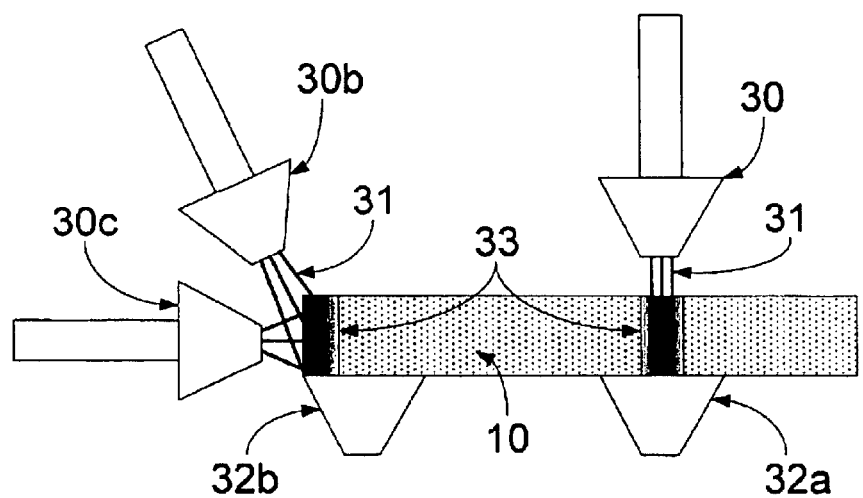
FIG. 12 is a schematic view of the coating application according to a sixth embodiment of the present invention.

As illustrated in FIG. 12, both the activator ejectors 30 and the coating material ejectors 14 (not shown) may be arranged to provide activated regions and coating regions both at the edge of the fiber batt 10 and at one or more positions across the width of the fiber batt that can later be split to form edge coating layers.

The description and illustrations of the present invention provided above are merely exemplary in nature and it is anticipated that those of ordinary skill in the art will appreciate that many variations of the specific method and apparatus described are possible without departing from the spirit and scope of the invention.

I claim:

1. A method of forming a coated fiber batt product comprising the steps of:

preparing a fiber batt having a first and a second major surface and two smaller edge surfaces and being characterized by a thickness and a width, wherein said fiber batt comprises a mixture of fibers consisting essentially of about 90 wt % glass fiber;

applying a first coating material to a portion of the fiber batt to form an impregnated region, the impregnated region extending substantially completely through the thickness of the fiber batt;

heating the impregnated region to a temperature sufficient to cause the first coating material to form a coating region; and splitting the fiber batt through the coating region to form a fiber batt product having an upper surface, a lower surface, and two edge surfaces and characterized by a thickness and a width, wherein an edge surface comprises a portion of the coating region.

2. A method of forming a coated fiber batt product according to claim 1, further comprising the steps of:

applying a second coating material to substantially all of the first major surface of the fiber batt to form a second impregnated region, the second impregnated region being adjacent the first major surface and characterized by a thickness that is not more than about 10 percent of the thickness of the fiber batt; and heating the second impregnated region to a temperature sufficient to cause the second coating material to form a coating layer on the first major surface.

3. A method of forming a coated fiber batt product according to claim 2, further comprising the steps of:

applying a third coating material to substantially all of the second major surface of the fiber batt to form a third impregnated region, the third impregnated region being adjacent the second major surface and characterized by a thickness that is not more than about 25–50 percent of the thickness of the fiber batt; and heating the third impregnated region to a temperature sufficient to cause the third coating material to form a coating layer on the first major surface.

4. A method of forming a coated fiber batt product according to claim 2, further comprising the steps of:

applying a non-woven fabric layer to the second impregnated region; and heating the second impregnated region to a temperature sufficient to cause the coating layer to adhere the non-woven fabric to the first major surface of the fiber batt.

5. A method of forming a coated fiber batt product according to claim 2, further comprising the steps of:

applying a film layer to the second impregnated region; and heating the second impregnated region to a temperature sufficient to cause the coating layer to adhere the film layer to the first major surface of the fiber batt.

6. A method of forming a coated fiber batt product according to claim 1, wherein the first coating material is selected from a group consisting of a coating solution, a coating slurry and dry particulate coating material.

7. A method of forming a coated fiber batt product according to claim 2, wherein the first coating material and the second coating material are selected from a group consisting of a coating solution, a coating slurry and dry particulate coating material.

8. A method of forming a coated fiber batt product according to claim 3, wherein the first coating material, the second coating material and the third coating material are selected from a group consisting of a coating solution, a coating slurry and dry particulate coating material.

9. A method of forming a coated fiber batt product according to claim 4, wherein the first coating material and the second coating material are selected from a group consisting of a coating solution, a coating slurry and dry particulate coating material.

10. A method of forming a coated fiber batt product comprising the steps of:

preparing a fiber batt having a first and a second major surface and two smaller edge surfaces and being characterized by a thickness and a width;

wherein the fiber batt comprises a mixture of fibers consisting essentially of about 10 wt % polyester fibers and about 90 wt % glass fibers and a binder composition;

activating a portion of the fiber batt to form an activated region, the activated region extending substantially completely through the thickness of the fiber batt;

activating a second portion of the fiber batt to form a second activated region, the second activated region covering substantially all of the first major surface of the fiber batt;

applying a first coating material comprising a powder comprising one or more materials selected from a group consisting of epoxies, acrylics, polyesters, and thermoplastics to the activated region of the fiber batt to form an impregnated region, the impregnated region extending substantially completely through the thickness of the fiber batt;

applying a second coating material to the second activated region to form a second impregnated region, the second impregnated region being adjacent the first major surface and characterized by a thickness that is not more than about 50% percent of the thickness of the fiber batt;

heating the impregnated region to a temperature sufficient to cause the coating material to form a coating region;

heating the second impregnated region to a temperature sufficient to cause the second material to form a coating layer on the first major surface; and splitting the fiber batt through the coating region to form a fiber batt product having an upper surface, a lower surface, and two edge surfaces and characterized by a thickness and a width, wherein an edge surface comprises a portion of the coating region.

11. A method of forming a coated fiber batt product according to claim 10, wherein the step of activating a portion of the fiber batt further comprises heating a portion of the fiber batt.

12. A method of forming a coated fiber batt product according to claim 10, the step of activating a portion of the fiber batt further comprises wetting a portion of the fiber batt.

13. A method of forming a coated fiber batt product according to claim 10, the step of activating a portion of the fiber batt further comprises applying a fluid to a portion of the fiber batt.

14. A method of forming a coated fiber batt product according to claim 10, the step of activating a portion of the fiber batt further comprises applying an adhesive solution to a portion of the fiber batt.

15. A method of forming a coated fiber batt product according to claim 10, the step of applying a first coating material to the activated region of the fiber batt to form an impregnated region further comprises applying a vacuum to the major surface opposite the major surface to which the coating material is being applied.

* * * * *